United States Patent [19]

Dongil et al.

[11] Patent Number: 4,819,062
[45] Date of Patent: Apr. 4, 1989

[54] ADAPTIVE-TYPE LUMINANCE/COLOR SIGNAL SEPARATION CIRCUIT USING THE HORIZONTAL AND VERTICAL CORRELATION IN TELEVISION RECEIVER

[75] Inventors: Song Dongil; Kim Chul-Jin; Kim Byung-Jin, all of Suwon, Rep. of Korea

[73] Assignee: Samsung Electronics Co., Ltd., Suwon, Rep. of Korea

[21] Appl. No.: 139,737

[22] Filed: Dec. 30, 1987

[30] Foreign Application Priority Data

Dec. 5, 1987 [KR] Rep. of Korea .................. 13892

[51] Int. Cl.$^4$ ............................. H04N 9/78
[52] U.S. Cl. ............................. 358/31; 358/37
[58] Field of Search ................... 358/31, 37

[56] References Cited

U.S. PATENT DOCUMENTS 4,609,938 9/1986 Suzuki et al. ................ 358/31
4,706,113 11/1987 Ito et al. ..................... 358/37

FOREIGN PATENT DOCUMENTS 149214 7/1985 European Pat. Off. ........... 358/37

OTHER PUBLICATIONS

Baldwin et al., Spatial Filters, IBA Technical Review, No. 8, Sep. 1976, pp. 41–48.

Primary Examiner—John W. Shepperd
Attorney, Agent, or Firm—Robert E. Bushnell

[57] ABSTRACT

The technique for separating luminance(Y)/color(C) signals in NTSC-type television TV receivers is disclosed. To decrease deterioration in picture quality due to inaccuracy of Y/C signal separation in color television receivers, comb filters have been used and a three-dimensional signal processing technique using a frame memory has recently been disclosed. To avoid a complicated constitution of circuit which consists in the necessity of large scale memory, this invention provides a Y/C signal separating circuit suitable for digitalization without increasing the complication of circuit by using a line memory. Also, horizontal and vertical peaking filters utilizing horizontal and vertical correlation of video signals in said separating process are provided to change the bandwidth of the filter according to signals, thereby improving in resolution and S/N ratio.

20 Claims, 6 Drawing Sheets

ADAPTIVE-TYPE LUMINANCE/COLOR SIGNAL SEPARATION CIRCUIT USING THE HORIZONTAL AND VERTICAL CORRELATION IN TELEVISION RECEIVER

BACKGROUND OF THE INVENTION

The present invention relates to a circuit for separating luminance signals/color signals (hereinafter referred to as "the Y/C separating circuit") in a television receiver of a NTSC system, and more particularly to the Y/C separating circuit which is simplified in constitution by using only a line memory and is suitable for the digitization of video signals, and which changes the bandwidth of the filter in accordance with the signals by use of the filter utilizing the horizontal and vertical correlation of video signals, thereby to improve resolution and the signal-to-noise ratio.

Recently, since the integration degree of an integrated circuit(IC) has improved, the digital signal processing can be performed economically. Accordingly, a digital type television(hereinafter referred to as "TV") can get to compete with an analog type TV in both price and function because reason the digital type TV makes it possible to perform the various signal processing methods which are impossible to perform in the analog type TV.

In a conventional color TV with an analog or digital signal processing system, the 1H type comb filter shown in FIG. 1 or the 2H type comb filter shown in FIG. 2 is used to separate the luminance/color signal from the composite video signal, thereby providing much improvement of picture quality over prior color TV. However, there still remains a problem of the deterioration in picture quality due to inaccuracy of the Y/C signal separation. Heretofore, there have been disclosed three-dimensional digital signal processing techniques in which the frame memory is used. However, these techniques have problems in which the constitution of the circuit becomes very complicated requires large scale memory and the price of the product become high.

SUMMARY OF THE INVENTION

It is, therefore, a primary object of the present invention to provide an improved luminance/color signal separating circuit. It is another object to provide a luminance/color signal separating circuit which is simplified in constitution by using only a line memory and is suitable for the digitization of video signals.

Another object of the invention is to provide a circuit which changes the bandwidth of the filter in accordance with the signals by use of the horizontal and vertical peaking filters utilizing the horizontal and vertical correlation of video signals, thereby improving resolution and the signal-to-noise ratio.

According to the present invention, there is provided, for performing said objects, a luminance/color signal separating circuit of the analog or digital signal processing system, comprising: a composite video signal delay means consisting of the delay elements made by line memories for performing the predetermined delay of the inputted composite video signal by said delay element to output the other various signals; a two-dimensional space filter means for filtering the produced signal from said composite video-signal delay means; a selecting means for selecting said spatial filter and peaking filter after operatingly comparing according to said output signals from said composite video signal delay means and detecting the vertical and horizontal correlation by said operatedly compared outputs; a low-pass filter means for peaking in the vertical direction when the horizontal correlation is higher than the vertical one; a band-pass filter means for peaking in the horizontal direction when the vertical correlation is higher than the horizontal one; a data selecting means for selecting the filter to output only the color signal from the video signal input by the outputs of said selecting means, said low-pass filter and said band-pass filter; and a luminance signal outputting means for compensating for the delay in said data selecting means, preventing the noise and the excessive peaking to compensate for the contour of the picture, and controlling the gains of the vertical and horizontal peaking signal.

BRIEF DESCRIPTION OF THE DRAWINGS

This invention will be more fully understood from the following detailed description of a preferred embodiment thereof, taken in connection with the accompanying drawings, in which.

DETAILED DESCRIPTION OF THE PREFERRED EMBODIMENT

Figure 1:
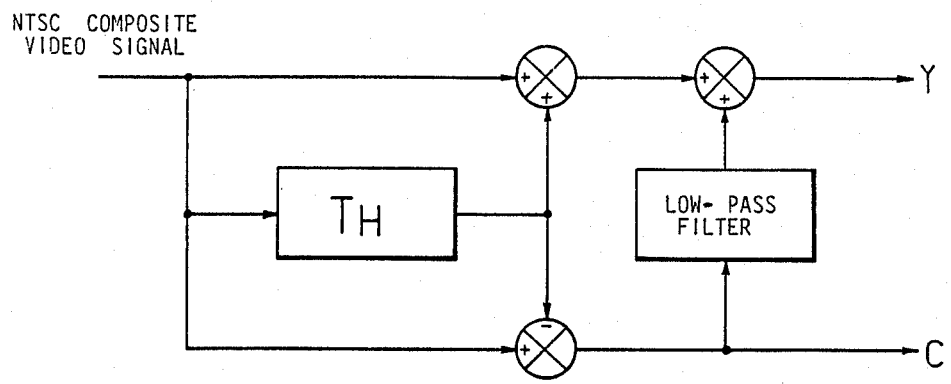
FIG. 1 is a schematically illustrated block diagram showing a conventional 1H type comb filter.
Figure 2:
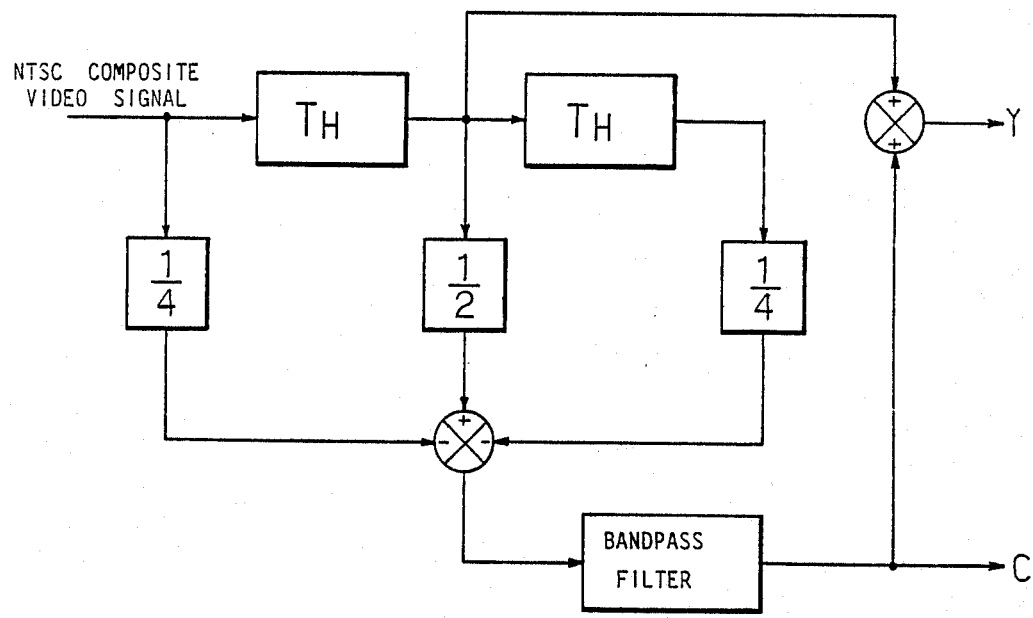
FIG. 2 is a schematically illustrated block diagram showing a conventional 2H type comb filter.
Figure 3:
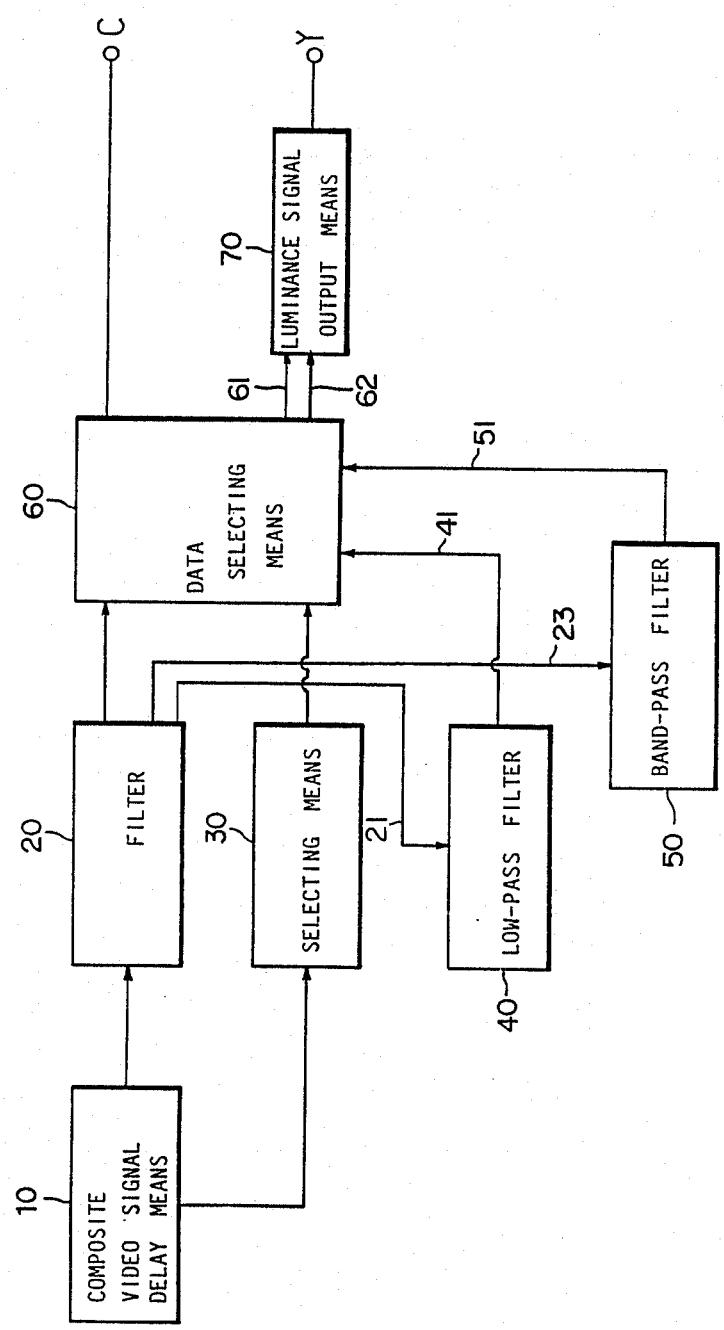
FIG. 3 is a block diagram of a Y/C signal separating circuit according to an embodiment of the present invention.

In FIG. 3 shown in block diagram an embodiment according to the present invention, there is shown a Y/C signal separating circuit in a TV receiver comprising a composite video signal delay means(10) consisting of the delay elements for performing the predetermined delay of the inputted composite video signal by said delay element to output the other various signals, a two-dimensional space filter means(20) for operating and filtering the produced signal from said composite video signal delay means(10), a selecting means(30) for selecting the proper spatial filter and the peaking filter by detecting the vertical and horizontal correlation according to the output from said composite video signal delay means(10), a low-pass filter means(40) for removing the chroma component from the received color signal of said two-dimensional space filter means(20) and separately outputting only the vertical peaking signal when the horizontal correlation is higher than the vertical one, a band-pass filter means(50) for separating and outputting only the horizontal peaking signal when the vertical correlation is higher than the horizontal one after receiving the luminance signal from said two-dimensional space filter means(20), a data selecting means(60) for selecting the filter to separately output only the color signal on the basis of the output signals of said selecting means(30), said low-pass filter means(40) and said band-pass filter means(50) from the video signal input, and a luminance signal outputting means(70) for compensating for the delay in said data selecting means(60) and preventing the noise and the excessive peaking to compensate for the contour of the picture, and controlling the gains of the vertical and the horizontal peaking signal which are output signals of said low-pass filter means(40) and said band-pass filter means(50) respectively.

Now, an embodiment of the present invention constituted as above-mentioned will be described.

The composite video signal delay means(10) receives at the input terminal the composite video signal to delay said signal by the delay elements thereof. The various delayed signals output from the output terminals of said delay elements are filtered by the two-dimensional space filter means(20) and are transmitted to the selecting means(30). And then, the operation of said delayed signals is executed, the numerical values of said operation results are compared with each other, and the correlation of the vertical-direction and the horizontal-direction is detected on the basis of said compared value. The proper space filter of said two-dimensional space filter means(20) and the peaking filters of the low-pass filter means(40) and the band-pass filter means(50) are selected on the basis of the detected correlation between the vertical peaking signal and the horizontal peaking signal. Namely, if the horizontal correlation is higher, the peaking in the vertical direction is performed in said low-pass filter means(40), and if the vertical correlation is higher, the peaking in the horizontal direction is performed in said band-pass filter means(50). Accordingly, in the data selecting means(60) the color signal is separated from the video signal by a compared output of said selecting means(30) and the outputs from said low-pass filter means(40) and said band-pass filter means(50). Also, by the luminance signal outputting means(70) is outputted the picture in which delay in said data selecting means (60) and the picture contour are compensated, noise is removed and the excessive peaking is prevented.

Figure 4:
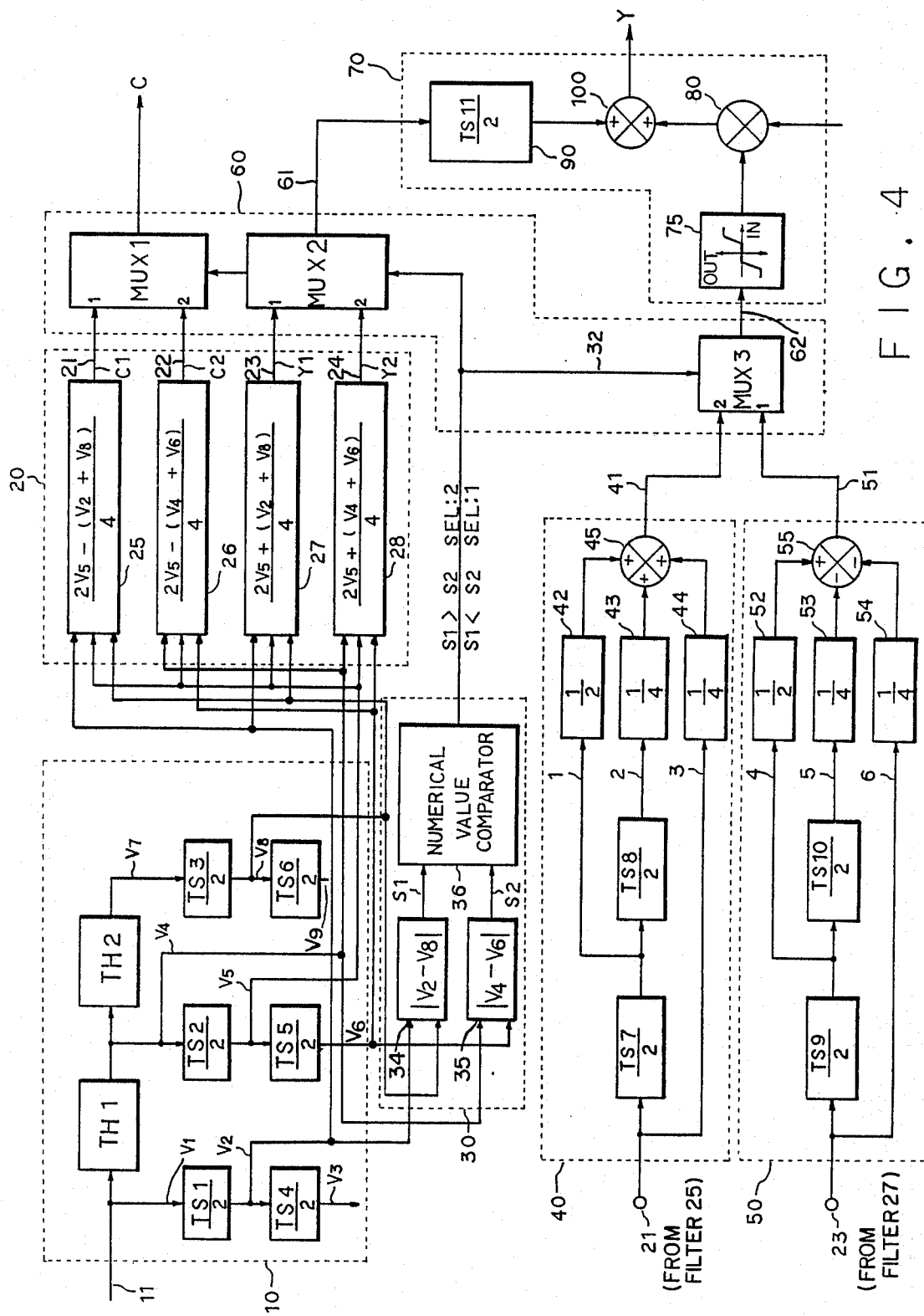
FIG. 4 is a detailed circuit diagram of Y/C signal separating circuit shown in FIG. 3 according to the present invention.

Referring to FIG. 4, there is shown in detail the Y/C signal separating circuit of FIG. 3 according to the present invention. In FIG. 4, TH1-TH2 and ½TS1-½TS11 are constituted by line memory, the delay element, TH, of them has a value 1/fH and TS has a value 1/fsc (where fH represents horizontal scanning frequency and fsc represents color subcarrier frequency). Assuming that on input of composite video signal is represented by V1, an output of said delay element ½TS1 is represented by V2, a output of the delay element ½TS4 is represented by V3, an output of the delay element TH1 is represented by V4, an output of the delay element ½TS2 is represented by V5, an output of the delay element ½TS5 is represented by V6, an output of the delay element TH2 is represented by V7, an output of the delay element ½TS3 is represented by V8, and an output of the delay element ½TS6 is represented by V9. Accordingly, means which is constituted to obtain each of said outputs V1-V9 corresponds to a composite video signal delay means(10).

Also, means which receive V2, V5 and V8 of outputs V1-V9 from said composite video signal delay means(10) to perform the logic operation by $$\frac{2V5 - (V2 + V8)}{4}$$

is the first filter (25), means which receive V4, V5 and V6 to perform the logic operation by $$\frac{2V5 - (V4 + V8)}{4}$$

is the 2nd filter(26), means which receive outputs V2, V5 and V8 to perform the logic operation by $$\frac{2V5 + (V2 + V8)}{4}$$

is the 3rd filter(27), and means which receive outputs V4, V5 and V6 to perform the logic operation by $$\frac{2V5 + (V4 + V8)}{4}$$

is the 4th filter(28). The means constituted by said the 1st-4th filters(25-28) correspond to the means(20).

Means which receives V2 and V8 of outputs V1-V9 from said composite video signal delay means(10) to perform the operation by |V2-V8| is the first absolute value operation means(34), means which performs the operation by |V4-V6| is the second absolute value operation means(35), and said comparator means(30) is consisted of said 1st and 2nd absolute value operation means(34 and 35), and a numerical value comparator(36) which compares outputs from said 1st and 2nd absolute value operation means(34 and 35) with each other.

The low-pass filter means(40) is constituted by such a manner that the color signal output 21 form the first filter(25) of said means(20) is supplied through the delay element ½TS7 to the delay element ½TS8 and to the first scale filter(42) as signal(1), the output signal(2) from said delay element ½TS8 is supplied the 2nd scale filter(43), and the output signal(21) from the first filter(25) is supplied to the 3rd scale filter(44), thereby to add in the first adder(45) outputs from the first to third scale filters(42-44) to provide signal(45).

The band-pass filter means(50) is constituted by such a manner that the luminance signal(23) output from the third filter(27) of said two-dimensional space filter means(20) is supplied to the delay element ½TS9 and to the 6th scale filter(54), the output signal(4) from the said delay element ½TS9 is supplied to the 4th scale filter(52) and to the delay element ½TS10, and the output signal(5) from said delay element ½TS10 is supplied to the 5th scale filter(53), thereby to add each of outputs from the 4th to 6th scale filters(52-54) in the second adder(55) to provide signal 51.

The data selecting means(60) is constituted in such a manner that outputs from the first and second filters(25 and 26) of said means(20) applied to multiplexer(MUX1), outputs from the third and fourth filters(27 and 28) are supplied to the multiplexer(MUX2), and each of outputs from said low-pass filter means(40) and said band-pass filter means(50) are applied to the multiplexer(MUX3), so that said multiplexer (MUX1-MUX3) select the data on the basis of output from said comparator means(30).

The luminance signal outputting means(70) includes a delay element ½TS11(90), a non-linear circuit(75), a gain control means(80), and a third adder(100). While multiplexer(MUX1) of said data selecting means(60) outputs the color signal C, in said luminance signal outputting means(70) the output from the multiplexer(MUX2) is supplied to said delay element ½TS11(90), the output from said multiplexer(MUX3) is supplied to said non-linear circuit(75), the output from the said non-linear circuit(75) is supplied to said gain control means(80) to be added to a sharpness gain signal, and the added output is supplied to the third adder(100).

Figure 5A:
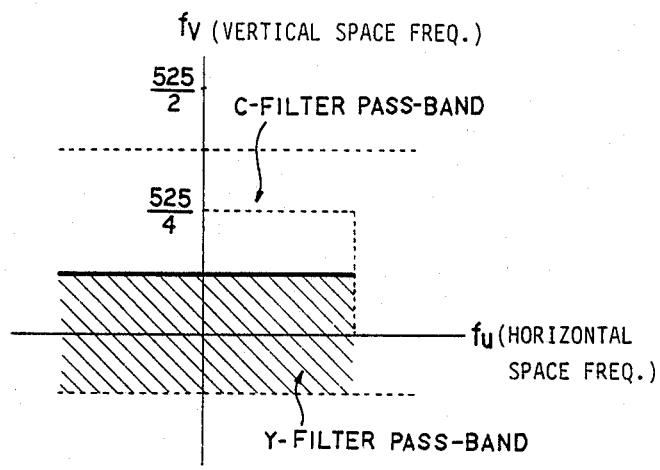
FIGS. 5A and 5B are graphs which illustrate respectively the spatial spectrum and the frequency selection characteristics according to the present invention.
Figure 5B:
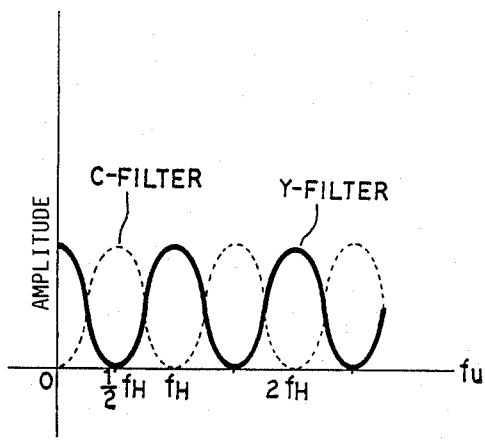

FIGS. 5A and 5B represent the spatial spectrum selection characteristic of and frequency selection characteristic filters 25, 27, respectively, according to the present invention.

Figure 6A:
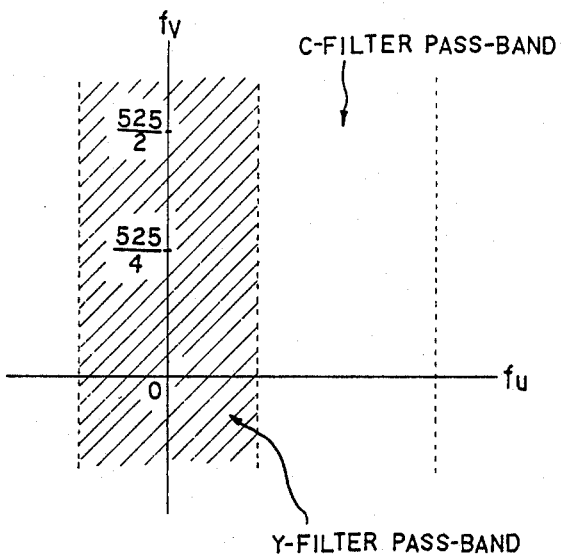
FIGS. 6A and 6B are graphs which illustrate respectively the two-dimensional spatial spectrum and the frequency selection characteristics according to the present invention.
Figure 6B:
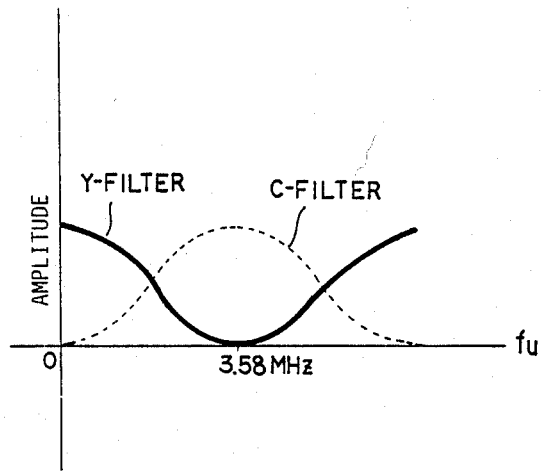

FIGS. 6A and 6B represent the two-dimensional spatial spectrum selection characteristic of and frequency selection characteristic filters 26, 28, respectively, according to the present invention.

Figure 7A:
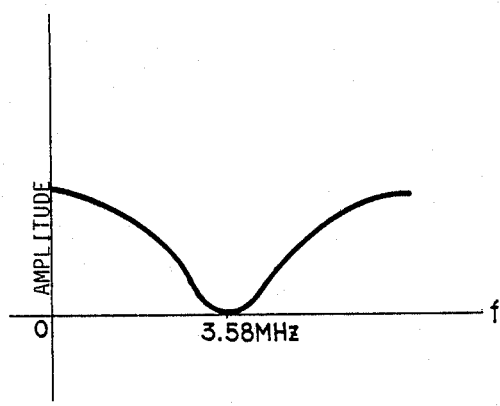
FIGS. 7A and 7B are graphs which illustrate the frequency characteristics of a low-pass filter means and a band-pass filter means, respectively, in FIG. 3 according to the present invention.
Figure 7B:
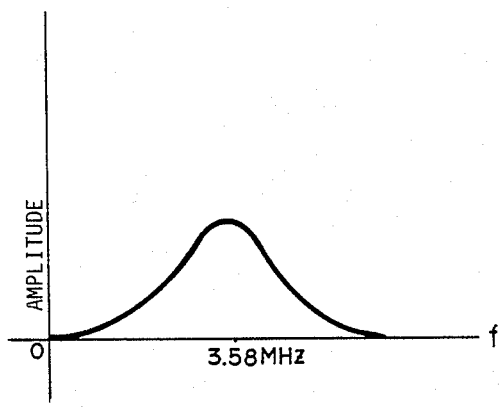

FIG. 7 shows waveforms for the frequency characteristics of the low-pass filter means(40) and the band-pass filter mean(50), in which FIG. 7A represents the output characteristic of the low-pass filter (40) and FIG. 7B represents the output characteristic of the band-pass filter(50).

Now, an embodiment of the present invention will be described in detail with reference to the aforementioned drawings.

When the composite video signal inputted at the input terminal(11) is supplied to delay elements(TH1, TH2, ½TS1-½TS6) made by line memories of the composite video signal delay means(10) in FIG. 3 and the predetermined values(V1-V9) are obtained, if the correlation in the vertical direction is higher, the operated output value |V2-V8| from the first absolute value operation means(34) of the comparator means(30) is smaller than the operated output value |V4-V6| from the second absolute value operation means(35). In this case, the luminance signal(Y) is filtered by the third filter(27) which performs operation of $$\frac{2V5 + (V2 + V8)}{4}$$

in the two-dimensional space filter means(20). The reason why filtering is performed by said third filter(27) is that the output from the numerical value comparator(30) of the selecting means(30) selects the terminal(1) of the multiplexers(MUX1, MUX2) in the data selecting means(60). Namely, because the correlation in the vertical direction is higher, the polarities of V5 and V2, V5 and V8 for the chroma signal component are inverted to output only the luminance(Y) signal after filtering. If, for the same reason, the color(C) signal is filtered by the first filter(25) which performs operation of $$\frac{2V5 - (V2 + V8)}{4}$$

in the filter means(20), the luminance(Y) signal which is high in the correlation between lines is offset relative to the other to obtain only the color(C) signal. In this case, the frequency selection characteristic of the luminance(Y) signal filter becomes $$\cos^2\left(\frac{\pi}{262.5} f_v\right)$$

and the frequency selection characteristic of the color(C) signal filter becomes $$\sin^2\left(\frac{\pi}{262.5} f_v\right)$$

(where fv presents the vertical spatial frequency). This can be represented by two-dimensional spatial spectrum and frequency selection characteristic curves as waveforms shown in FIGS. 5A and 5B.

Assuming that the correlation in the horizontal direction is higher in the composite video signal, in the comparator means(30) the numerical value comparator(36) compares the output of the first absolute value operation means(34) with the output of the second absolute value operation means(35), if the output value of the first absolute value operation means (34) is larger than the output value of the 2nd absolute value operation means(35) (|V2-V8|>|V4-V6|), the luminance(Y) signal is filtered by the 4th filter(28) which performs operation of $$\frac{2V5 + V4 + V6}{4}$$

in the two-dimensional spatial filter means(20). Namely, because the correlation in the horizontal direction is higher, the polarities of V5 and V4, V5 and V6 for the chroma signal component are inverted to output only the luminance(Y) signal after filtering. If, for the same reason, the color(C) signal is filtered by the 2nd filter(26) which performs operation of $$\frac{2V5 - V4 - V6}{4},$$

the luminance(Y) signal which is high in the horizontal correlation is offset relative to the other and removed to obtain only the color(C) signal. In this case, the frequency selection characteristic of the luminance(Y) signal filter becomes $$\cos^2\left(\frac{\pi f}{2 f_{sc}}\right)$$

and the frequency selection characteristic of the color(C) signal filter becomes $$\sin^2\left(\frac{\pi f}{2 f_{sc}}\right)$$

(where fsc represents the color subcarrier frequency). This can be represented by two-dimensional spatial spectrum and frequency selection characteristic curves as waveforms shown in FIGS. 6A and 6B.

The present invention selects the proper filter according to the horizontal or vertical correlation of the composite video signal inputted as the above-mentioned to perform the Y/C signal separation. Accordingly, the present invention, as compared with the conventional 1H or 2H type comb filter, can increase the accuracy of Y/C signal separation and can reduce the interference of crosstalk between Y and C signals.

Also, in order to increase the resolution, if the correlation in the horizontal direction is higher, then the vertical peaking signal is selected to add to the luminance(Y) signal, and if the correlation in the vertical direction is higher, then the horizontal peaking signal is selected to add to the luminance(Y) signal. Therefore, the picture contour is compensated to increase the resolution in outer appearance.

In FIG. 4 the principle of compensation for the contour will be explained in detail. If the correlation in the horizontal direction is higher, the color(C1) signal output from the two-dimensional space filter means(20) is passed through the low-pass filter means(40) so that the chroma component may be removed and only the vertical peaking signal is separated, thereby being added to the luminance(Y) signal in the third adder(100) through the multiplexer(MUX3), the non-linear circuit(75) and the sharpness gain means(80).

If the correlation in the vertical direction is higher, the luminance(Y) signal output from the two-dimensional space filter means(20) is passed through the band-pass filter means(50) so that only the horizontal peaking signal is obtained, thereby being added to the luminance(Y) signal in the third adder(100) through the multiplexer(MUX3), the non-linear circuit(75) and the sharpness gain means(80).

The frequency selection characteristic of the above-mentioned embodiment is as the characteristic waveforms shown in FIGS. 7A and 7B.

As the above-described, according to the present invention, there is provided a Y/C signal separating circuit in which the constitution of circuit is simplified by using only the line memory and which is suitable for digitization. Also this invention has advantages which can improve resolution and signal-to-noise ratio by changing the bandwidth of the filter in accordance with the signals with the use of horizontal and vertical peaking filters utilizing the horizontal and vertical correlation of video signals.

What is claimed is:

1. A circuit for separating luminance and color signals for use in a color television receiver, said circuit comprising:
    composite video signal delay means having a plurality of delay elements consisting of line memories for generating a plurality of delayed signals from a received composite video signal;
    first filter means for filtering the delayed signals generated by said composite video signal delay means to provide a plurality of filtered signals;
    first selecting means for performing a comparative operation upon delayed signals received from said delay means to detect vertical and horizontal correlation, and for generating output signals representative of said correlation;
    band-pass peaking filter means for separating and providing only a horizontal peaking signal when vertical correlation is higher than horizontal correlation after receiving a luminance signal from said first filter means;
    low-pass peaking filter means for separating and outputting only a vertical peaking signal when the horizontal correlation is higher than the vertical correlation after receiving a chrominance signal from said first filter means;
    data selecting means for selecting one set of said filtered signals in order to output a chrominance signal and a luminance signal on the basis of said output signal of said first selecting means, and for selecting one of said horizontal peaking and vertical peaking signals on the basis of said output signals; and
    luminance signal outputting means for compensating for delay in said data selecting means, for preventing noise and excessive peaking to compensate for picture contour and for controlling gains of the vertical and horizontal peaking signals.

2. The circuit of claim 1, wherein said first selecting means performs said comparative operation of inputs by determining relative magnitudes between a plurality of absolute values of differences between selected pairs of said delayed signals.

3. The circuit of claim 2, wherein said first filter means comprises a plurality of filter elements providing a plurality of discrete chrominance signals and a plurality of discrete luminance signals, and said data selecting means selects one of said chrominance signals and one of said luminance signals on the basis of relative magnitudes determined in said comparative operation.

4. The circuit of claim 1, wherein said first filter means comprises a plurality of filter elements providing a plurality of discrete chrominance signals and a plurality of discrete luminance signals, and said data selecting means selects one of said chrominance signals and one of said luminance signals on the basis of said output signals.

5. The circuit of claim 1, wherein:
    said first selecting means performs said comparative operation by determining relative magnitude between a plurality of absolute values of differences between selected pairs of said delayed signals and provides a first of said output signals when said comparative operation indicates that vertical correlation is higher than horizontal correlation and a second of said output signal when said comparative operation indicates that horizontal correlation is higher than vertical correlation, and
    said data selecting means provides said horizontal peaking signal as said selected one of said vertical peaking and horizontal peaking signals in response to said first of said output signals and said vertical peaking signal as said selected one of said vertical peaking and horizontal peaking signals in response to said second of said output signals.

6. A circuit for selecting luminance and chrominance signals for use in a color television receiver, said circuit comprising:
    delay means for receiving composite video signals including chrominance and luminance components and for generating a plurality of delayed signals from said composite video signals;
    first filter means for filtering signal obtained from said delay means to provide a plurality of chrominance signals and a plurality of luminance signals;
    peaking filter means for providing a vertical peaking signal from a designated one of said chrominance signals received from said first filter means and for providing a horizontal peaking signal from a designated one of said luminance signals received from said first filter means;

comparator means for performing a comparative operation on said delayed signals, for selecting on the basis of said comparative operation, a selected one of said chrominance signals and a selected one of said luminance signals provided by said first filter means, and a selected one of said vertical peaking and horizontal peaking signals provided by said peaking filter means; and selector means for providing said selected one of said vertical peaking and horizontal peaking signals, said selected one of said chrominance signals, and said selected one of said luminance signals as separate signals.

7. The circuit of claim 6, further comprising compensating means for operating on and combining said selected one of said luminance signal and said selected one of said vertical peaking and horizontal peaking signals to generate a luminance output compensating for delay induced by said selector means.

8. The circuit of claim 6, wherein said comparator means performs said comparative operation on delayed signals by determining relative magnitudes between a plurality of absolute values of differences between selected pairs of said delayed signals.

9. The circuit of claim 7, wherein:
said first filter means comprises a plurality of filter elements providing a plurality of discrete chrominance signals and a plurality of discrete luminance signals, and
said comparator means selects one of said chrominance signals and one of said luminance signals on the basis of relative magnitudes determined in said comparative operation.

10. The circuit of claim 6, wherein:
said first filter means comprises a plurality of filter elements providing a plurality of discrete chrominance signals and a plurality of discrete luminance signals.

11. The circuit of claim 6, wherein:
said comparator means performs said comparative operation by determining relative magnitudes between a plurality of absolute values of differences between selected pairs of said delayed signals and provides a first output signal when said comparative operation indicates that vertical correlation is higher than horizontal correlation and a second output signal when said comparative operation indicates that horizontal correlation is higher than vertical correlation, and
said selector means provides said horizontal peaking signal as said selected one of said vertical peaking and horizontal peaking signals in response to said first output signal and said vertical peaking signal as said selected one of said vertical peaking and horizontal peaking signals in response to said second output signal.

12. The circuit of claim 7, wherein:
said comparator means performs said comparative operation by determining relative magnitudes between a plurality of absolute values of differences between selected pairs of said delayed signals and provides a first output signal when said comparative operation indicates that vertical correlation is higher than horizontal correlation and a second output signal when said comparative operation indicates that horizontal correlation is higher than vertical correlation, and
said selector means provides said horizontal peaking signal as said selected one of said vertical peaking and horizontal peaking signals in response to said first output signal and said vertical peaking signal as said selected one of said vertical peaking and horizontal peaking signals in response to said second output signal.

13. A circuit for separating luminance and chrominance signals for use in a color television receiver, said circuit comprising:
a line memory having a plurality of memory elements, coupled to receive composite video signals including chrominance and luminance components and provide a plurality of delayed signals from said composite vide signals;
first filter means for filtering signals obtained from said memory elements to provide a plurality of chrominance signals and a plurality of luminance signals;
first peaking filter means for removing chroma components from a designated one of said chrominance signals received from said first filter means and providing a vertical peaking signal;
second peaking filter means for receiving a designated one of said luminance signals from said first filter means and for providing a horizontal peaking signal;
comparator means for selecting one of said vertical peaking and horizontal peaking signals, a selected one of said chrominance signals and a selected one of said luminance signals on the basis of a comparative operation performed on said delayed signals; and
selector means for providing said selected one of said vertical peaking and horizontal peaking signals, said selected one of said chrominance signals, and said selected one of said luminance signals as separate signals.

14. The circuit of claim 13, further comprising compensating means for operating on and combining said selected one of said luminance signal and said selected one of said vertical peaking and horizontal peaking signals to generate a luminance output compensating for delay induced by said selector means.

15. The circuit of claim 12, wherein:
said first filter means comprises a plurality of filter elements providing a plurality of discrete chrominance signals and a plurality of discrete luminance signals, and
said comparator means selects one of said chrominance signals and one of said luminance signals on the basis of relative magnitudes determined in said comparative operation.

16. The circuit of claim 14, wherein:
said comparator means performs said comparative operation by determining relative magnitudes between a plurality of absolute values of differences between selected pairs of said delayed signals and provides a first output signal when said comparative operation indicates that vertical correlation is higher than horizontal correlation and a second output signal when said comparative operation indicates that horizontal correlation is higher than vertical correlation, and
said selector means provides said horizontal peaking signal as said selected one of said vertical peaking and horizontal peaking signals in response to said first output signal and said vertical peaking signal as said selected one of said vertical peaking and horizontal peaking signals in response to said second output signal.

17. The circuit of claim 13, wherein said comparator means performs said comparative operation of delayed signals by determining relative magnitudes between a plurality of absolute values of differences between selected pairs of said delayed signals.

18. The circuit of claim 13, wherein:
said first filter means comprises a plurality of filter elements providing a plurality of discrete chrominance signals and a plurality of discrete luminance signals.

19. The circuit of claim 18, wherein:
said comparator means performs said comparative operation by determining relative magnitudes between a plurality of absolute values of differences between selected pairs of said delayed signals and provides a first output signal when said comparative operation indicates that vertical correlation is higher than horizontal correlation and a second output signal when said comparative operation indicates that horizontal correlation is higher than vertical correlation, and said selector means provides said horizontal peaking signal as said selected one of said vertical peaking and horizontal peaking signals in response to said first output signal and said vertical peaking signal as said selected one of said vertical peaking and horizontal peaking signals in response to said second output signal.

20. The circuit of claim 13, wherein:
said comparator means performs said comparative operation by determining relative magnitudes between a plurality of absolute values of differences between selected pairs of said delayed signals and provides a first output signal when said comparative operation indicates that vertical correlation is higher than horizontal correlation and a second output signal when said comparative operation indicates that horizontal correlation is higher than vertical correlation, and said selector means provides said horizontal peaking signal as said selected one of said vertical peaking and horizontal peaking signals in response to said first output signal and said vertical peaking signal as said selected one of said vertical peaking and horizontal peaking signals in response to said second output signal.

* * * * *

UNITED STATES PATENT AND TRADEMARK OFFICE
CERTIFICATE OF CORRECTION

PATENT NO. : 4,819,062
DATED : 4 April 1989
INVENTOR(S) : Dong-Il SONG, et al.

It is certified that error appears in the above-identified patent and that said Letters Patent is hereby corrected as shown below:

On the title page, Item [19[:

Line 2,    replace "Dongil et al." with --Song et al.--.

Signed and Sealed this

Twelfth Day of April, 1994

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 4,819,062
DATED : April 4, 1989
INVENTOR(S) : Dong-Il Song, et al.

It is certified that error appears in the above-indentified patent and that said Letters Patent is hereby corrected as shown below:

| | | |
|---|---|---|
| Column 1, | Line 24, | after "because", delete "reason"; |
| Column 3, | Line 56, | preceding "input ", change "on" to --an--; |
| Column 4, | Line 10-13, | after "+" change "V8 " to -- "V6 " --; |
| | Line 22-24, | after "+" (the second occurrence), change "V8" to --V6--; |
| | Line 39, | after "21", change "form" to --from--; |

Signed and Sealed this

Fifth Day of November, 1996

*Attest:*

BRUCE LEHMAN

*Attesting Officer*     *Commissioner of Patents and Trademarks*